US009877313B2

United States Patent
Kim et al.

(10) Patent No.: US 9,877,313 B2
(45) Date of Patent: Jan. 23, 2018

(54) METHOD FOR TRANSMITTING DOWNLINK CONTROL CHANNEL BY BASE STATION IN WIRELESS COMMUNICATION SYSTEM, AND DEVICE THEREFOR

(75) Inventors: Kitae Kim, Anyang-si (KR); Jinyoung Chun, Anyang-si (KR); Minseok Noh, Anyang-si (KR); Hyunsoo Ko, Anyang-si (KR); Jaehoon Chung, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 14/360,584

(22) PCT Filed: Jun. 15, 2012

(86) PCT No.: PCT/KR2012/004730
§ 371 (c)(1),
(2), (4) Date: Aug. 8, 2014

(87) PCT Pub. No.: WO2013/077517
PCT Pub. Date: May 30, 2013

(65) Prior Publication Data
US 2014/0348099 A1    Nov. 27, 2014

Related U.S. Application Data

(60) Provisional application No. 61/563,611, filed on Nov. 25, 2011.

(51) Int. Cl.
*H04L 5/00* (2006.01)
*H04W 72/04* (2009.01)
*H04L 1/18* (2006.01)

(52) U.S. Cl.
CPC ........ *H04W 72/042* (2013.01); *H04L 1/1861* (2013.01); *H04L 5/0051* (2013.01);
(Continued)

(58) Field of Classification Search
CPC ..... H04L 1/1861; H04L 5/001; H04L 5/0037; H04L 5/0051; H04L 5/0055; H04W 72/042
See application file for complete search history.

(56) References Cited

U.S. PATENT DOCUMENTS

2009/0285193 A1    11/2009 Kim et al.
2010/0067461 A1*   3/2010 Kwak ................... H04L 1/0026
                                                    370/329
(Continued)

FOREIGN PATENT DOCUMENTS

KR    10-2011-0081749    7/2011
WO    2011/085195        7/2011

OTHER PUBLICATIONS

PCT International Application No. PCT/KR2012/004730, Written Opinion of the International Searching Authority dated Jan. 24, 2013, 17 pages.

*Primary Examiner* — Andrew Lai
*Assistant Examiner* — M Mostazir Rahman
(74) *Attorney, Agent, or Firm* — Lee Hong Degerman Kang Waimey

(57) ABSTRACT

Disclosed is a method for transmitting a downlink control channel by a base station in a wireless communication system. More particularly, the method comprises the following steps: setting a transmission resource for transmitting the downlink control channel in a data area of a subframe; mapping one or more first control channels for downlink acknowledgement(ACK)/negative-ACK(NACK) information to the transmission resource; and transmitting the mapped one or more first control channels, wherein the one
(Continued)

or more first control channels are mapped to a location adjacent to a terminal specific reference signal existing in the transmission resource.

4 Claims, 21 Drawing Sheets

(52) U.S. Cl.
CPC ............ *H04L 5/0055* (2013.01); *H04L 5/001* (2013.01); *H04L 5/0037* (2013.01)

(56) References Cited

U.S. PATENT DOCUMENTS

| | | |
|---|---|---|
| 2011/0044391 A1 | 2/2011 | Ji et al. |
| 2011/0075624 A1* | 3/2011 | Papasakellariou .... H04L 5/0053 370/329 |
| 2011/0141987 A1* | 6/2011 | Nam ...................... H04L 1/0003 370/329 |
| 2011/0261769 A1* | 10/2011 | Ji .......................... H04L 5/0007 370/329 |
| 2012/0093095 A1* | 4/2012 | Barbieri ............ H04W 72/0426 370/329 |

* cited by examiner

FIG. 2
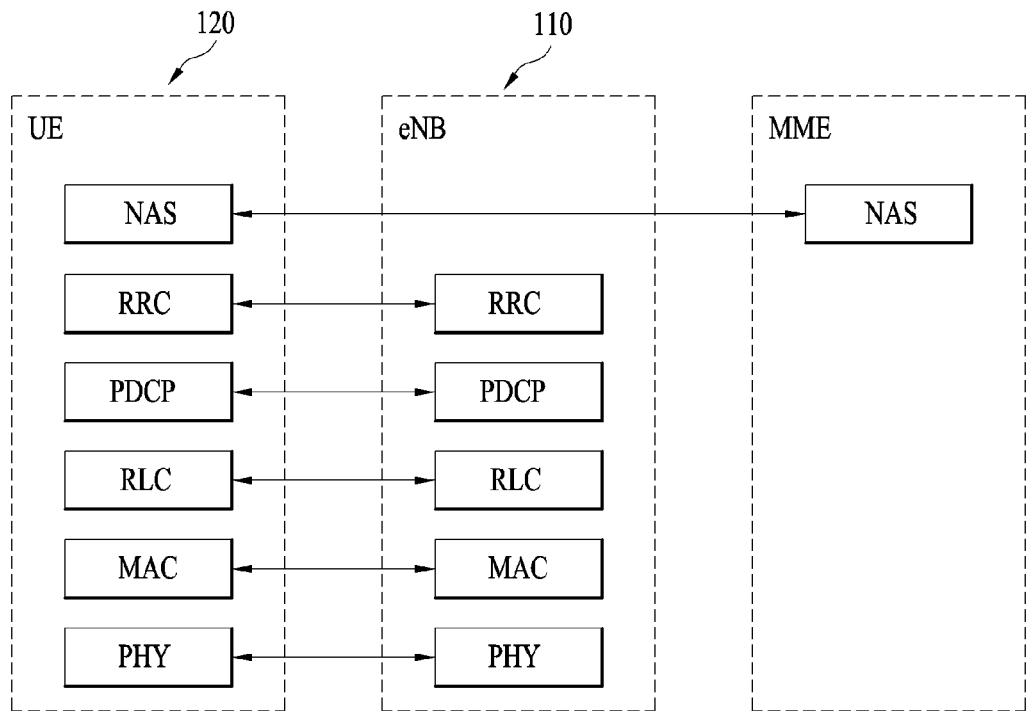
(a) control-plane protocol stack
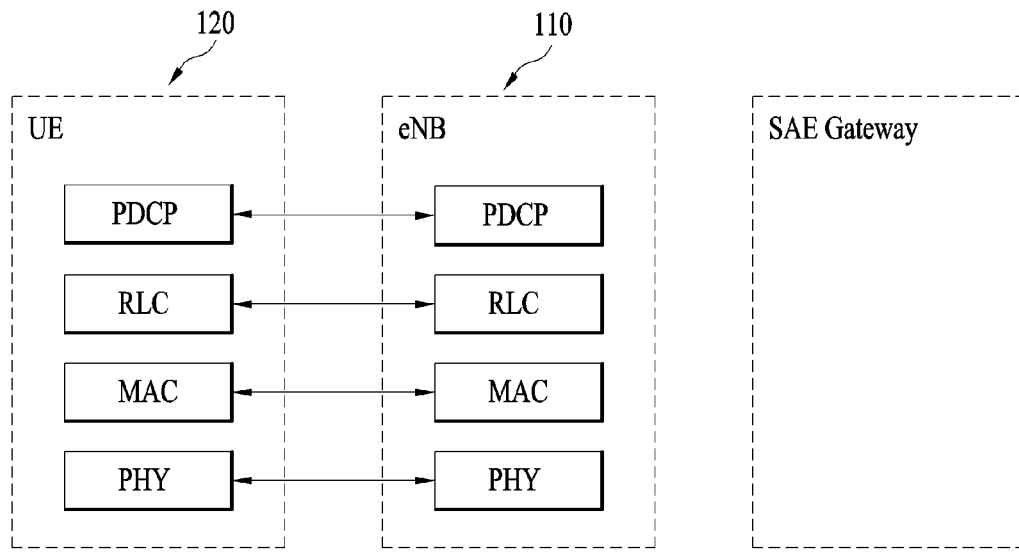
(b) user-plane protocol stack ▨ : DMRS Group1

▩ : DMRS Group2

METHOD FOR TRANSMITTING DOWNLINK CONTROL CHANNEL BY BASE STATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2012/004730, filed on Jun. 15, 2012, which claims the benefit of U.S. Provisional Application Ser. No. 61/563,611 filed on Nov. 25, 2011, the contents of which are all hereby incorporated by reference herein in their entirety.

TECHNICAL FIELD

The present invention relates to a wireless communication system and, more particularly, to a method for transmitting a downlink control channel by a base station in a wireless communication system, and an apparatus therefore.

BACKGROUND ART

A brief description is now given of a 3rd generation partnership project long term evolution (3GPP LTE, hereinafter simply referred to as LTE) communication system as an example of a mobile communication system to which the present invention is applicable.

FIG. 1 is a view schematically illustrating the network structure of an evolved universal mobile telecommunications system (E-UMTS) as an exemplary wireless communication system. The E-UMTS is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference may be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits downlink scheduling information to notify a corresponding UE of a time/frequency domain in which data is to be transmitted, coding, data size, hybrid automatic repeat and request (HARQ)-related information, etc. by transmitting downlink scheduling information to the UE. In addition, regarding uplink (UL) data, the eNB transmits uplink scheduling information to a corresponding UE to inform the UE of an available time/frequency domain, coding, data size, HARQ-related information, etc. An interface for transmitting user traffic or control traffic may be used between eNBs. A core network (CN) may include the AG and a network node for user registration of the UE. The AG manages mobility of a UE on a tracking area (TA) basis, each TA including a plurality of cells.

Although wireless communication technology has been developed up to LTE based on wideband code division multiple access (WCDMA), demands and expectations of users and service providers continue to increase. In addition, since other radio access technologies continue to be developed, new advances in technology are required to secure future competitiveness. For example, reduction in costs per bit, increase in service availability, flexible use of frequency band, simple and open interface, appropriate power consumption of a UE, etc. are required.

DISCLOSURE

Technical Problem

An object of the present invention devised to solve the problem lies in a method for transmitting a downlink control channel by a base station in a wireless communication system, and an apparatus therefore.

Technical Solution

The object of the present invention can be achieved by providing a method for transmitting a downlink control channel by a base station in a wireless communication system, the method including configuring transmission resources for the downlink control channel in a data region of a subframe, mapping one or more first control channels carrying downlink acknowledgment (ACK)/negative ACK (NACK) information to the transmission resources, and transmitting the mapped one or more first control channels, wherein the one or more first control channels are mapped to locations near a user equipment (UE)-specific reference signal (RS) which is present in the transmission resources.

The method may further include mapping one or more second control channels carrying downlink control information to the transmission resources, and transmitting the mapped one or more second control channels.

In this case, the one or more first control channels may be modulated based on the UE-specific RS which is defined by a preset antenna port, and the one or more second control channels may be modulated based on the UE-specific RSs which are defined by different antenna ports, respectively.

Alternatively, each of the one or more second control channels may correspond to one first control channel, and the corresponding first and second control channels may be modulated based on the UE-specific RS which is defined by a same antenna port.

In another aspect of the present invention, provided herein is a base station apparatus in a wireless communication system, the apparatus including a processor for configuring transmission resources for the downlink control channel in a data region of a subframe, and mapping one or more first control channels carrying downlink acknowledgment (ACK)/negative ACK (NACK) information to the transmission resources, and a radio frequency (RF) module for transmitting the mapped one or more first control channels, wherein the processor maps the one or more first control channels to locations near a user equipment (UE)-specific reference signal (RS) which is present in the transmission resources.

The processor may map one or more second control channels carrying downlink control information to the transmission resources, and the RF module may transmit the mapped one or more second control channels.

In this case, the processor may modulate the one or more first control channels based on the UE-specific RS which is defined by a preset antenna port, and modulate the one or more second control channels based on the UE-specific RSs which are defined by different antenna ports, respectively.

Alternatively, each of the one or more second control channels may correspond to one first control channel, and the processor may modulate the corresponding first and second control channels based on the UE-specific RS which is defined by a same antenna port.

Advantageous Effects

According to embodiments of the present invention, a base station in a wireless communication system may efficiently transmit one or more control channels in a legacy data region.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a view illustrating the structures of a control plane and a user plane of a radio interface protocol between a UE and an E-UTRAN based on the 3GPP radio access network specification;

BEST MODE

Figure 1:
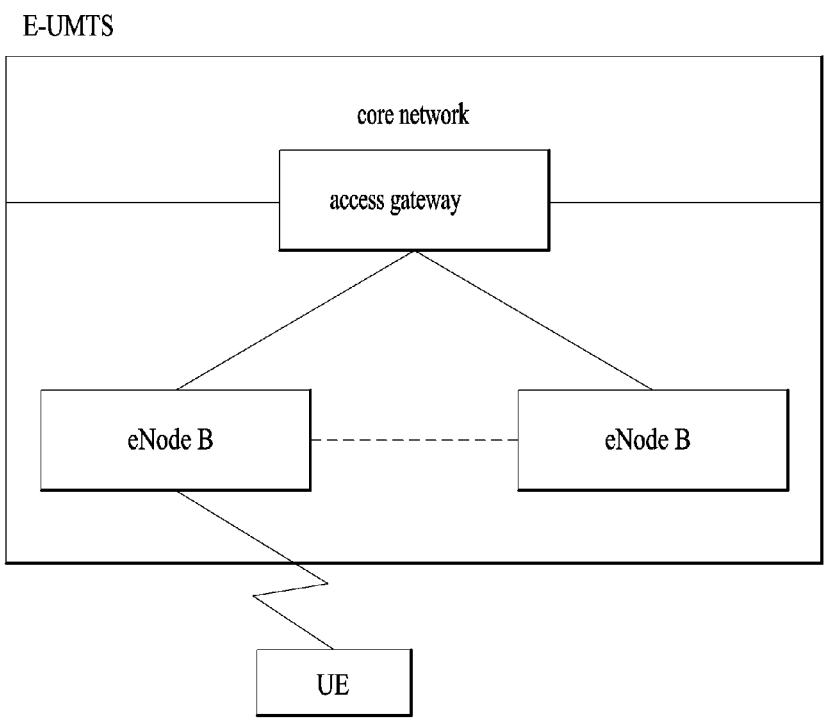
FIG. 1 is a view schematically illustrating the network structure of an E-UMTS as an exemplary wireless communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

FIG. 2 is a view illustrating the structures of a control plane and a user plane of a radio interface protocol between a UE and an E-UTRAN based on the 3GPP radio access network specification. The control plane refers to a path used by the UE and the network to transmit a control message for call management. The user plane refers to a path for transmitting data generated in an application layer, e.g., voice data or Internet packet data.

A physical layer of a first layer provides an information transfer service to an upper layer using a physical channel. The physical layer is connected to a media access control (MAC) layer of an upper layer through a transport channel. Data is transmitted between the MAC layer and the physical layer through the transport channel. Data is transmitted between physical layers of a transmitter and a receiver through a physical channel. The physical channel uses time and frequency as radio resources. Specifically, the physical channel is modulated using orthogonal frequency division multiple Access (OFDMA) in downlink and modulated using single carrier frequency division multiple access (SC-FDMA) in uplink.

A MAC layer of a second layer provides a service to a radio link control (RLC) layer of an upper layer through a logical channel. The RLC layer of the second layer supports reliable data transmission. The function of the RLC layer may be implemented by a functional block within the MAC layer. A packet data convergence protocol (PDCP) layer of the second layer performs header compression to reduce unnecessary control information for efficient transmission of an Internet protocol (IP) packet such as IPv4 or IPv6 on a radio interface having a relatively narrow bandwidth.

A radio resource control (RRC) layer located at the bottom of a third layer is defined only in the control plane.

The RRC layer controls logical channels, transport channels, and physical channels in relation to configuration, re-configuration, and release of radio bearers (RBs). An RB refers to a service provided by the second layer to transmit data between the UE and the network. To this end, the RRC layers of the UE and the network exchange an RRC message. The UE is in an RRC connected mode if RRC connection is established between the RRC layers of the UE and the network. Otherwise, the UE is in an RRC idle mode. A non-access stratum (NAS) layer located at an upper level of the RRC layer performs functions such as session management and mobility management.

A cell managed by an eNB is configured to use one of bandwidths of 1.4, 3, 5, 10, 15, and 20 MHz to provide a downlink or uplink transmission service to multiple UEs. Different cells may be configured to provide different bandwidths.

Downlink transport channels for data transmission from the network to the UE include a broadcast channel (BCH) for transmitting system information, a paging channel (PCH) for transmitting a paging message, and a DL shared channel (SCH) for transmitting user traffic or a control message. Traffic or a control message for a downlink multicast or broadcast service may be transmitted on the DL SCH or a separate downlink multicast channel (MCH). Uplink transport channels for data transmission from the UE to the network include a random access channel (RACH) for transmitting an initial control message and a UL SCH for transmitting user traffic or a control message. Logical channels located at an upper level of and mapped to the transport channels include a broadcast control channel (BCCH), a paging control channel (PCCH), a common control channel (CCCH), a multicast control channel (MCCH), a multicast traffic channel (MTCH), etc.

Figure 3:
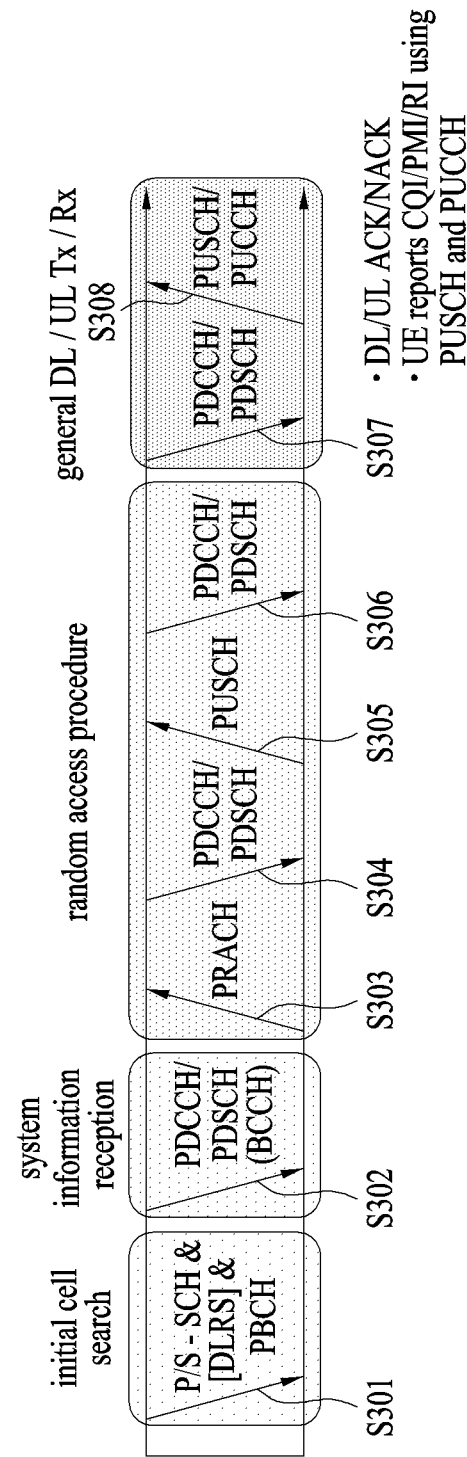
FIG. 3 is a view illustrating physical channels used in a 3GPP system and a general signal transmission method using the same.

FIG. 3 is a view illustrating physical channels used in a 3GPP system and a general signal transmission method using the same.

When a UE is powered on or enters a new cell, the UE performs an initial cell search procedure such as synchronization with an eNB (S301). To this end, the UE may be synchronized with the eNB by receiving a primary synchronization channel (P-SCH) and a secondary synchronization channel (S-SCH) from the eNB and acquire information such as a cell identity (ID). After that, the UE may acquire broadcast information within a cell by receiving a physical broadcast channel from the eNB. In the initial cell search procedure, the UE may monitor a downlink channel state by receiving a downlink reference signal (DL RS).

Upon completion of the initial cell search procedure, the UE may acquire detailed system information by receiving a physical downlink control channel (PDCCH) and receiving a physical downlink shared channel (PDSCH) based on information carried on the PDCCH (S302).

If the UE initially accesses the eNB or if no radio resource is present for signal transmission, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general uplink/downlink signal transmission procedure. Specifically, the UE receives downlink control information (DCI) through the PDCCH. The DCI includes control information such as resource assignment information for the UE and has different formats according to the use thereof.

Control information transmitted to the eNB in uplink or received from the eNB in downlink by the UE includes a downlink/uplink acknowledgment (ACK)/negative ACK (NACK) signal, a channel quality indicator (CQI), a precoding matrix index (PMI), a rank indicator (RI), etc. In the 3GPP LTE system, the UE may transmit the control information such as CQI/PMI/RI through a PUSCH and/or a PUCCH.

Figure 4:
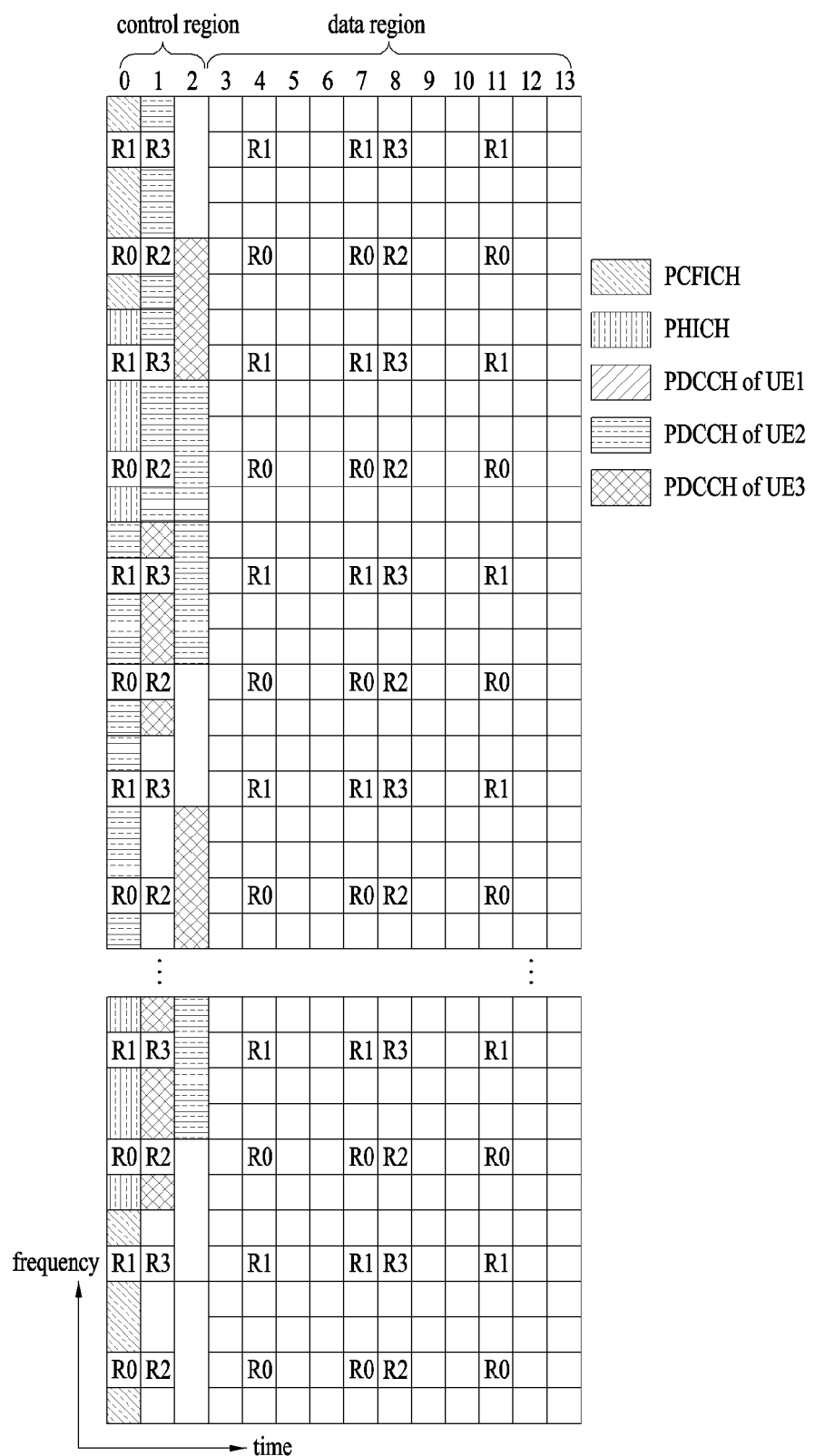
FIG. 4 is a view illustrating the structure of a downlink radio frame used in an LTE system.

FIG. 4 is a view illustrating control channels included in a control region of one subframe in a downlink radio frame.

Referring to FIG. 4, one subframe includes 14 OFDM symbols. First 1 to 3 OFDM symbols may be used as a control region and the remaining 11 to 13 OFDM symbols may be used as a data region, according to the configuration of a subframe. In FIG. 4, R1 to R4 represent reference signals (RSs) or pilot signals for antennas 0 to 3, respectively. The RSs are fixed to a predetermined pattern within the subframe irrespective of the control region and the data region. Control channels are assigned to resources not used for RSs in the control region. Traffic channels are assigned to resources not used for RSs in the data region. The control channels assigned to the control region include a physical control format indicator channel (PCFICH), a physical hybrid-ARQ indicator channel (PHICH), a physical downlink control channel (PDCCH), etc.

The PCFICH informs a UE of the number of OFDM symbols used for the PDCCH in every subframe. The PCFICH is located at the first OFDM symbol and configured prior to the PHICH and the PDCCH. The PCFICH includes 4 resource element groups (REGs) which are distributed over the control region based on a cell ID. One REG includes 4 resource elements (REs). An RE indicates a minimum physical resource defined as 1 subcarrier×1 OFDM symbol. The PCFICH value indicates values of 1 to 3 or values of 2 to 4 depending on a bandwidth and is modulated using quadrature phase shift keying (QPSK).

The PHICH is used to carry a HARQ ACK/NACK signal for uplink transmission. That is, the PHICH indicates a channel through which DL ACK/NACK information for UL HARQ is transmitted. The PHICH includes one REG and is cell-specifically scrambled. The ACK/NACK signal is indicated by 1 bit and modulated using binary phase shift keying (BPSK). The modulated ACK/NACK signal is spread with a spreading factor (SF)=2 or 4. A plurality of PHICHs mapped to the same resource form a PHICH group. The number of PHICHs multiplexed to the PHICH group is determined depending on the number of spreading codes. The PHICH (group) is repeated three times to obtain diversity gain in the frequency domain and/or the time domain.

The PDCCH is assigned to the first n OFDM symbols of a subframe. In this case, n is an integer equal to or greater than 1 and indicated by the PCFICH. The PDCCH includes one or more control channel elements (CCEs). The PDCCH informs each UE or UE group of information related to resource assignment of a paging channel (PCH) and a downlink shared channel (DL-SCH) which are transport channels, uplink scheduling grant, HARQ information, etc. The PCH and the DL-SCH are transmitted through a PDSCH. Accordingly, an eNB and a UE normally transmit and receive data other than specific control information or service data through the PDSCH.

Information indicating to which UE or UEs PDSCH data is to be transmitted and information indicating how the UEs should receive and decode the PDSCH data are transmitted on the PDCCH. For example, assuming that a cyclic redundancy check (CRC) of a specific PDCCH is masked with a radio network temporary identity (RNTI) "A" and information about data transmitted using a radio resource "B" (e.g., frequency location) and transport format information "C" (e.g., transport block size, modulation scheme, coding information, etc.) is transmitted in a specific subframe, a UE located in a cell monitors the PDCCH using RNTI information thereof. If one or more UEs having RNTI "A" are present, the UEs receive the PDCCH and receive a PDSCH indicated by "B" and "C" based on information of the received PDCCH.

A basic resource unit of a downlink control channel is an REG. The REG includes four contiguous REs other than REs carrying RSs. A PCFICH and a PHICH include 4 REGs and 3 REGs, respectively. A PDCCH is configured on a control channel element (CCE) basis, each CCE including 9 REGs.

To determine whether a PDCCH including L CCEs is transmitted to a UE, the UE is configured to monitor $M^{(L)}$ ($\geq L$) CCEs which are arranged contiguously or in a specific rule. The value L which should be considered by the UE to receive the PDCCH may be a plural number. CCE sets which should be monitored by the UE to receive the PDCCH are referred to as a search space. For example, an LTE system defines the search space as shown in Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, L denotes a CCE aggregation level and indicates the number of CCEs in a PDCCH, $S_k^{(L)}$ denotes a search space for the CCE aggregation level L, and $M^{(L)}$ denotes the number of candidate PDCCHs to be monitored in the search space for the CCE aggregation level L.

The search space may be classified into a UE-specific search space accessible only by a specific UE and a common search space accessible by all UEs within a cell. A UE monitors common search spaces for CCE aggregation levels 4 and 8 and UE-specific search spaces for CCE aggregation levels 1, 2, 4, and 8. The common search space and the UE-specific search space may overlap with each other.

For each CCE aggregation level, the location of the first CCE (a CCE having the smallest index) of a PDCCH search space assigned to an arbitrary UE changes in every subframe according to the UE. This is called PDCCH search space hashing.

The CCEs may be distributed over a system band. Specifically, a plurality of logically contiguous CCEs may be input to an interleaver and the interleaver may permute the input CCEs on an REG basis. Accordingly, the time/frequency resources of one CCE are distributed physically over the whole time/frequency domain of a control region of a subframe. Consequently, since a control channel is configured on a CCE basis but interleaved on an REG basis, a frequency diversity gain and an interference randomization gain can be maximized.

A detailed description is now given of an RS.

In general, for channel measurement, a transmitter transmits an RS, which is known to both the transmitter and a receiver, to the receiver together with data. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

In general, for channel measurement, an RS known to both a transmitter and a receiver is transmitted together with data from the transmitter to the receiver. In addition to channel measurement, the RS serves to perform demodulation by indicating a modulation scheme. The RS is classified into a dedicated RS (DRS) for an eNB and a specific UE, i.e., a UE-specific RS, and a common RS (CRS) for all UEs within a cell, i.e., a cell-specific RS. The cell-specific RS includes an RS used by a UE to measure and report CQI/PMI/RI to an eNB. This type of RS is referred to as a channel state information-RS (CSI-RS).

Figure 5:
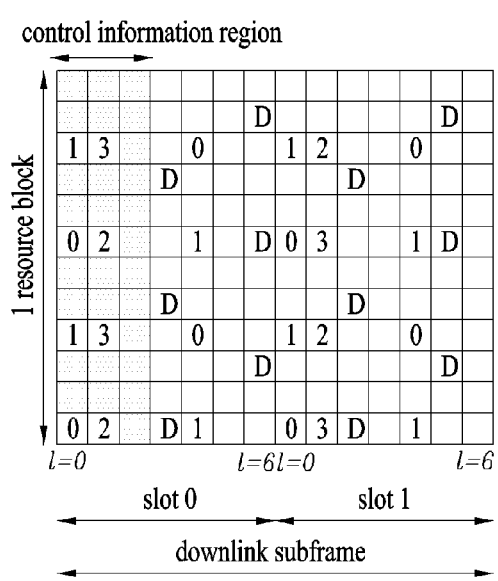
FIGS. 5 and 6 are views illustrating the structures of a reference signal (RS) in an LTE system supporting downlink transmission using four antennas.
Figure 6:
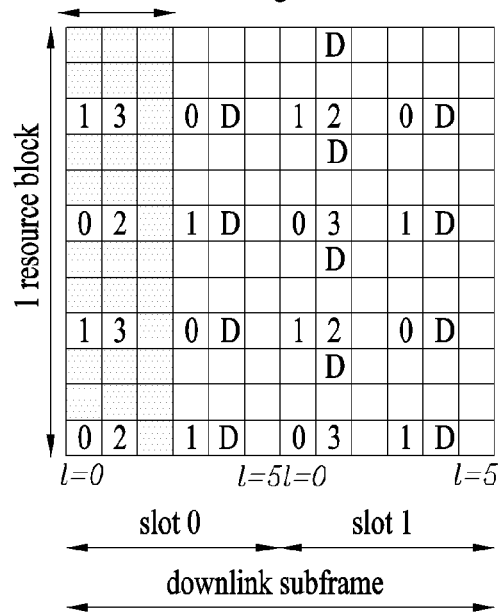

FIGS. 5 and 6 are views illustrating the structures of an RS in an LTE system supporting downlink transmission using four antennas. Specifically, FIG. 5 illustrates the case of a normal cyclic prefix (CP) and FIG. 6 illustrates the case of an extended CP.

Referring to FIGS. 5 and 6, "0" to "3" marked within boxes respectively denote cell-specific RSs, i.e., CRSs, transmitted through antenna ports 0 to 3 for channel measurement and data modulation. The CRSs may be transmitted to UEs over a control information region as well as a data information region.

"D" marked within boxes denotes a demodulation (DM)-RS which is a UE-specific RS. The DM-RSs are transmitted in a data region, that is, through a PDSCH, to support single-antenna port transmission. Whether the DM-RS, UE-specific RS, is present is indicated to a UE through higher-layer signaling. FIGS. 5 and 6 illustrate DM-RSs corresponding to antenna port 5, and 3GPP TS 36.211 also defines DM-RSs for a total of eight antenna ports, antenna ports 7 to 14.

Figure 7:
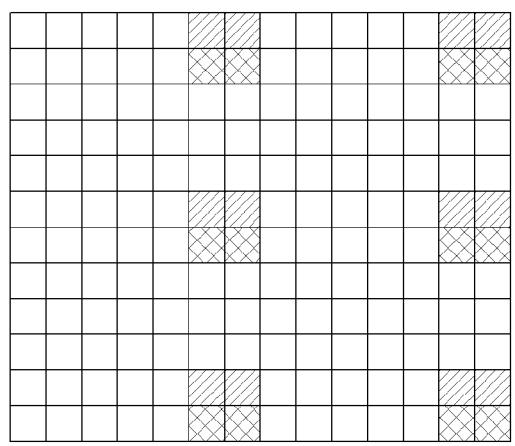
FIG. 7 illustrates exemplary demodulation (DM)-RS assignment defined in the current 3GPP standard.

FIG. 7 illustrates exemplary DM-RS assignment defined in the current 3GPP standard.

Referring to FIG. 7, DM-RSs corresponding to antenna ports {7, 8, 11, 13} are mapped using a sequence per antenna port in DM-RS group 1, and DM-RSs corresponding to antenna ports {9, 10, 12, 14} are also mapped using a sequence per antenna port in DM-RS group 2.

Equation 1 is used to generate a DM-RS sequence in an LTE system.

$$r_{n_s}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

In Equation 1, c(n) is a pseudo-random sequence and defined using a gold sequence having a length of 31 as shown in Equation 2.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

In Equation 2, $N_C$ is 1600 and a first m-sequence has an initial value of $x_1(0)=1$ and $x_1(n)=0$ (where n=1 to 30). An initial value of a second m-sequence is defined as $c_{init}=\sum_{i=0}^{30}x_2(i)\cdot 2^i$ and determined according to the use of the sequence. In a DM-RS sequence, $c_{init}$ is defined as shown in Equation 3.

$$c_{init}=(\lfloor n_s/2 \rfloor+1)\cdot(2N_{ID}^{cell}+1)\cdot 2^{16}+n_{RNTI} \quad \text{[Equation 3]}$$

Referring to Equation 3, during DM-RS assignment, a DM-RS is multiplexed using an orthogonal code in the time domain and $n_{RNTI}$ is set to 0 or 1 to perform quasi-orthogonal DM-RS assignment. That is, since $n_{RNTI}$ is set to $n_{RNTI}=\{0, 1\}$, a quasi-orthogonal pseudo-random sequence is generated. In addition, $N_{ID}^{cell}$ denotes a cell identity and, more particularly, a physical cell identity (PCI).

The above-described CSI-RS has been proposed for the purpose of channel measurement of a PDSCH, separately from a CRS. Unlike the CRS, the CSI-RS may be defined as up to 32 different CSI-RS configurations to reduce inter-cell interference (ICI) in a multi-cell environment.

Figure 8:
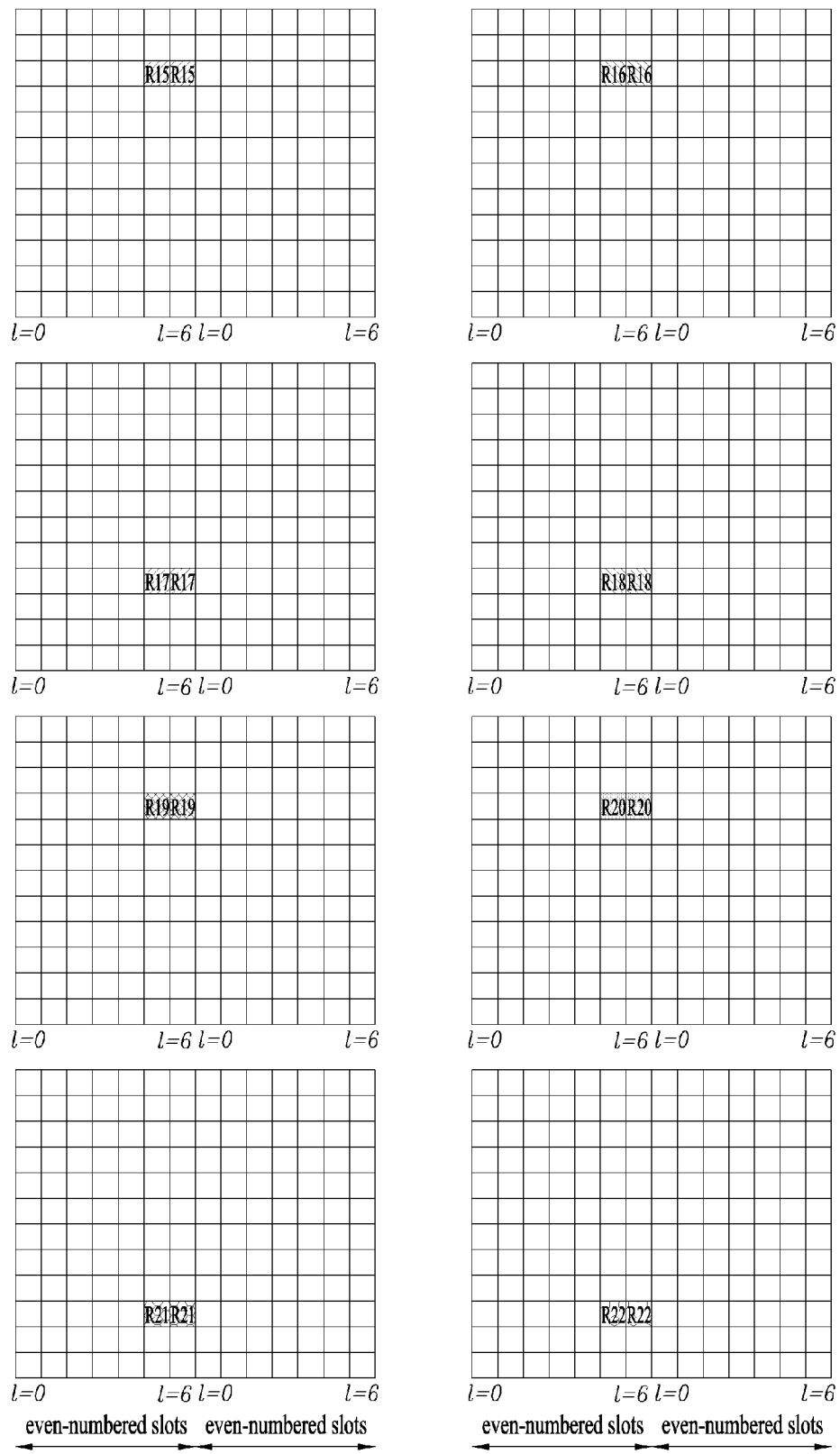
FIG. 8 illustrates channel state information (CSI)-RS configuration #0 in the case of a normal cyclic prefix (CP) among CSI-RS configurations defined in the current 3GPP standard.

The CSI-RS configuration varies according to the number of antenna ports, and contiguous cells are configured to transmit CSI-RSs configured as differently as possible. The CSI-RS supports up to 8 antennas unlike the CRS. In the 3GPP standard, up to 8 antennas, antenna ports 15 to 22, are assigned as antenna ports for the CSI-RS. FIG. 8 illustrates CSI-RS configuration #0 in the case of a normal CP among CSI-RS configurations defined in the current 3GPP standard.

In current wireless communication environments, the data throughput required by a cellular network increases very rapidly with the emergence and widespread use of various devices requiring machine-to-machine (M2M) communication and high data rate. To satisfy high data throughput, the communication technology is developed into carrier aggregation etc. for enabling efficient use of a larger number of frequency bands, and MIMO, coordinated multi-point (CoMP), etc. for increasing data capacity within a limited frequency band. In addition, communication environments evolve to increase the density of accessible nodes in the vicinity of a user. A system equipped with high-density nodes may exhibit higher system performance due to cooperation between nodes. This scheme provides much better performance than a non-cooperative case in which each node serves as an independent base station (BS), advanced BS (ABS), node-B (NB), eNode-B (eNB), access point (AP), etc.

Figure 9:
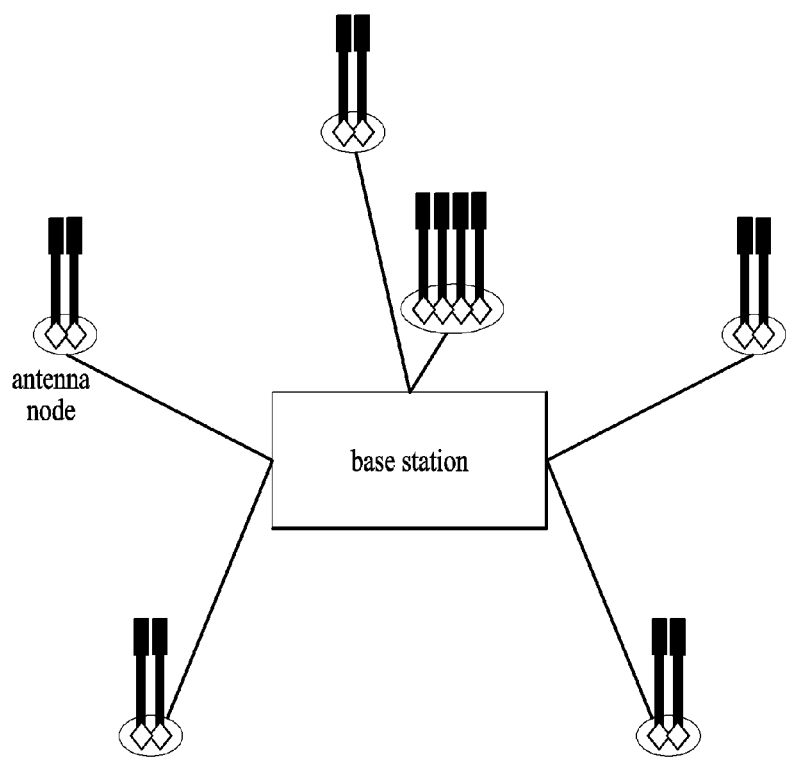
FIG. 9 is a view illustrating a multi-node system in a next-generation communication system.

FIG. 9 is a view illustrating a multi-node system in a next-generation communication system.

Referring to FIG. 9, if transmission and reception of all nodes are managed by one controller and thus an individual node operates as an antenna group of a cell, this system may be regarded as a distributed multi-node system (DMNS) which forms a single cell. In this case, the individual nodes may be assigned additional node IDs or operate as antennas in a cell without the node IDs. However, if the nodes have different cell IDs, this system may be regarded as a multi-cell system. If multiple cells overlap with each other according to their coverage, this is called a multi-tier network.

A node may be a Node B, eNB, picocell eNB (PeNB), home eNB (HeNB), remote radio head (RRH), relay, distributed antenna, etc. At least one antenna is installed in one node. A node is also called a transmission point. While a node refers to a group of antennas spaced apart from each other by a predetermined distance or more, the present invention is applicable even when a node is defined as an arbitrary antenna group irrespective of the distance between antennas.

Owing to introduction of a multi-node system, various communication techniques have become available, thereby improving channel quality. However, a new control channel is required to apply MIMO and CoMP to the multi-node environment. In this context, enhanced PDCCH (E-PDCCH) is under discussion and it is regulated that the E-PDCCH is assigned to a data region (hereinafter referred to as a PDSCH region) rather than a legacy control region (hereinafter referred to as a PDCCH region). Consequently, since the E-PDCCH enables transmission of control information for a node to each UE, lack of the legacy PDCCH region may be solved. For reference, the E-PDCCH is not provided to legacy UEs and only LTE-A UEs can receive the E-PDCCH.

Figure 10:
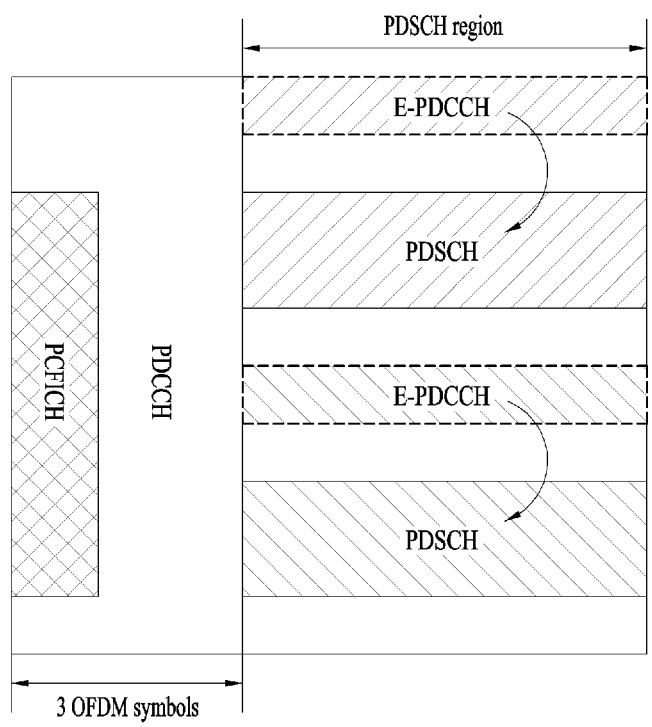
FIG. 10 is a view illustrating an enhanced physical downlink control channel (E-PDCCH) and a physical downlink shared channel (PDSCH) scheduled by the E-PDCCH.

FIG. 10 is a view illustrating an E-PDCCH and a PDSCH scheduled by the E-PDCCH.

Referring to FIG. 10, an E-PDCCH may be defined in a portion of a PDSCH region in which data is generally transmitted. A UE should perform blind decoding to detect whether an E-PDCCH directed to the UE is present. The E-PDCCH performs scheduling (e.g., PDSCH and PUSCH control) like a legacy PDCCH. However, if the number of UEs connected to a node such as an RRH is increased, a larger number of E-PDCCHs are assigned to the PDSCH region and thus the number of times that blind decoding is performed by the UE is increased, thereby increasing complexity.

A method for multiplexing E-PDCCHs for a plurality of UEs needs to be considered. Specifically, a multiplexing technique for cross-interleaving E-PDCCHs of multiple UEs in the frequency domain or the time domain while a common resource region, i.e., a common PRB set, is configured has been proposed.

Figure 11:
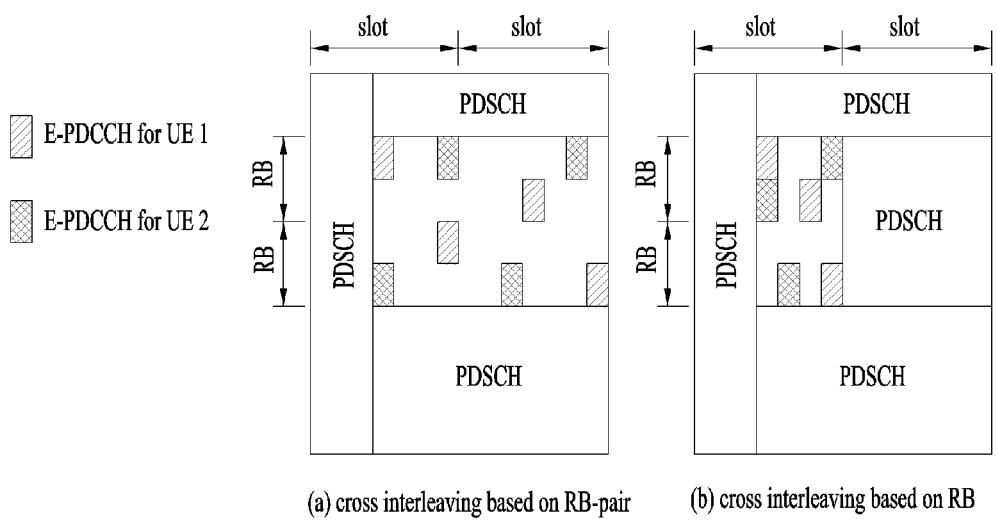
FIG. 11 is a view illustrating a method for multiplexing E-PDCCHs for a plurality of UEs.

FIG. 11 is a view illustrating a method for multiplexing E-PDCCHs for a plurality of UEs.

Specifically, FIG. 11(a) illustrates an example in which a common PRB set is configured on a PRB pair basis and cross interleaving is performed based on the PRB pair. On the other hand, FIG. 11(b) illustrates an example in which a common PRB set is configured on a PRB basis and cross interleaving is performed based on the PRB. This scheme has an advantage of obtaining diversity gain in terms of the frequency/time domain over a plurality of RBs.

An E-PDCCH resource region may be classified into an interleaving resource region for applying cross interleaving and a non-interleaving resource region for not applying cross interleaving. Alternatively, the E-PDCCH resource region may be classified into a resource region for a common search space and a resource region for a UE-specific search space. Furthermore, the E-PDCCH resource region may be classified into a resource region for a first RNTI set and a resource region for a second RNTI, among a plurality of RNTIs.

Figure 12:
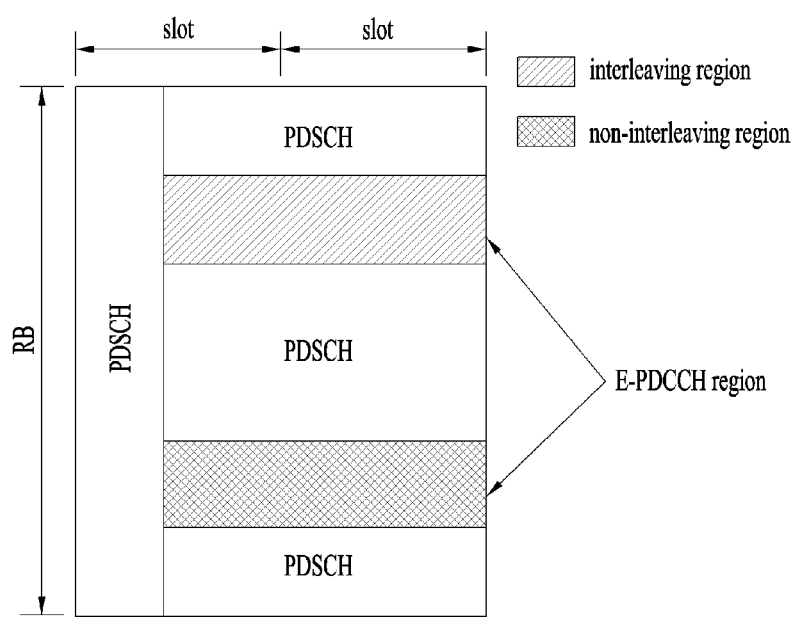
FIG. 12 illustrates an exemplary E-PDCCH configured by dividing a resource region thereof into an interleaving resource region and a non-interleaving resource region.

FIG. 12 illustrates an exemplary E-PDCCH configured by dividing a resource region thereof into an interleaving resource region and a non-interleaving resource region. In this case, to decode the E-PDCCH, DM-RS port assignment suitable for each region needs to be performed and a DM-RS sequence needs to be configured correspondingly.

The 3GPP standardization committee currently considers transmission of a PHICH in a data region rather than a legacy control region, separately from the above described E-PDCCH. This is called an enhanced PHICH (ePHICH). In the 3GPP standardization committee, a new carrier type is under discussion in addition to the E-PDCCH and the ePHICH. One of the major issues about the new carrier type is whether to exclude a CRS. Accordingly, if the CRS is no more supported by the new carrier type, a legacy PHICH based on channel estimation using the CRS may also be supported no more.

As such, the present invention proposes a method for transmitting and assigning an ePHICH. In general, an E-PDCCH assignment region can be divided into a common region using a common RS (e.g., common DM-RS or grouped UE-specific DM-RS) and an individual region using a UE-specific DM-RS. However, the present invention may freely apply methods proposed below irrespective of the divided regions.

Embodiment 1

Embodiment 1 of the present invention proposes to locate an ePHICH near a DM-RS to maximize the accuracy of channel estimation when the ePHICH is assigned to a data region. Although the data region itself can be generally divided into a region to which interleaving is applied and a region to which interleaving is not applied, to locate an ePHICH near a DM-RS irrespective of the divided regions is advantageous in terms of reliability. However, interleaving is performed on only available REs other than REs to be assigned to the ePHICH, in the region to which interleaving is applied.

Figure 17:
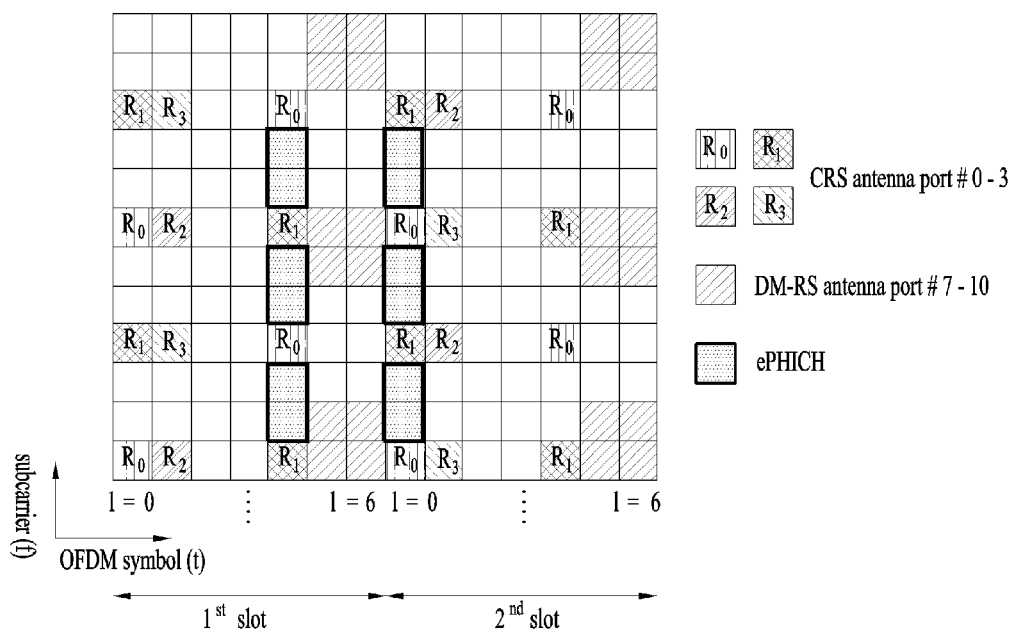
Figure 18:
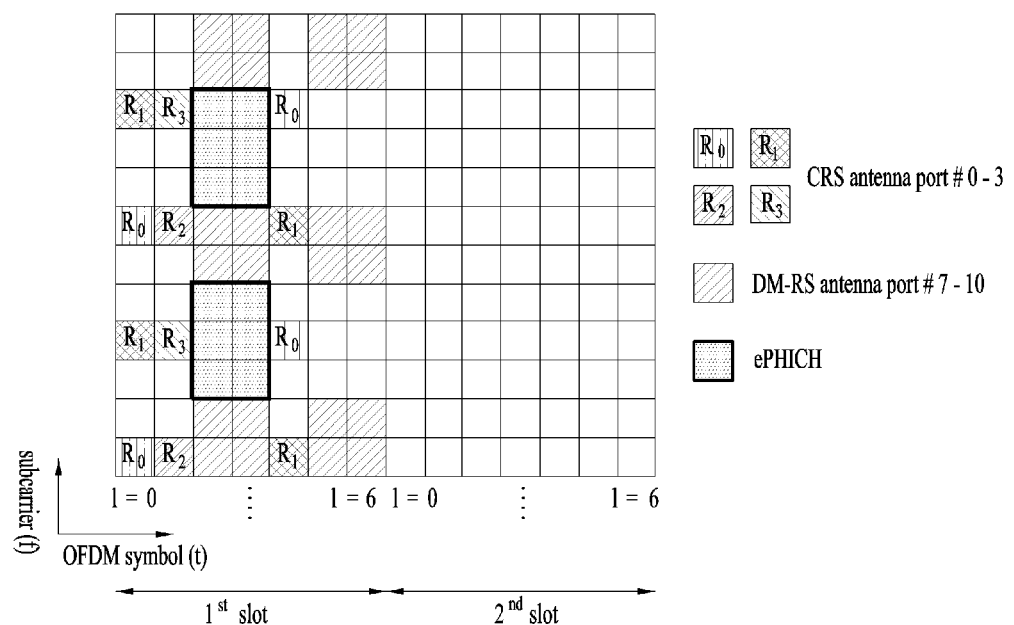
FIGS. 18 and 19 are views illustrating other examples of the ePHICH mapping pattern according to Embodiment 1 of the present invention.
Figure 19:
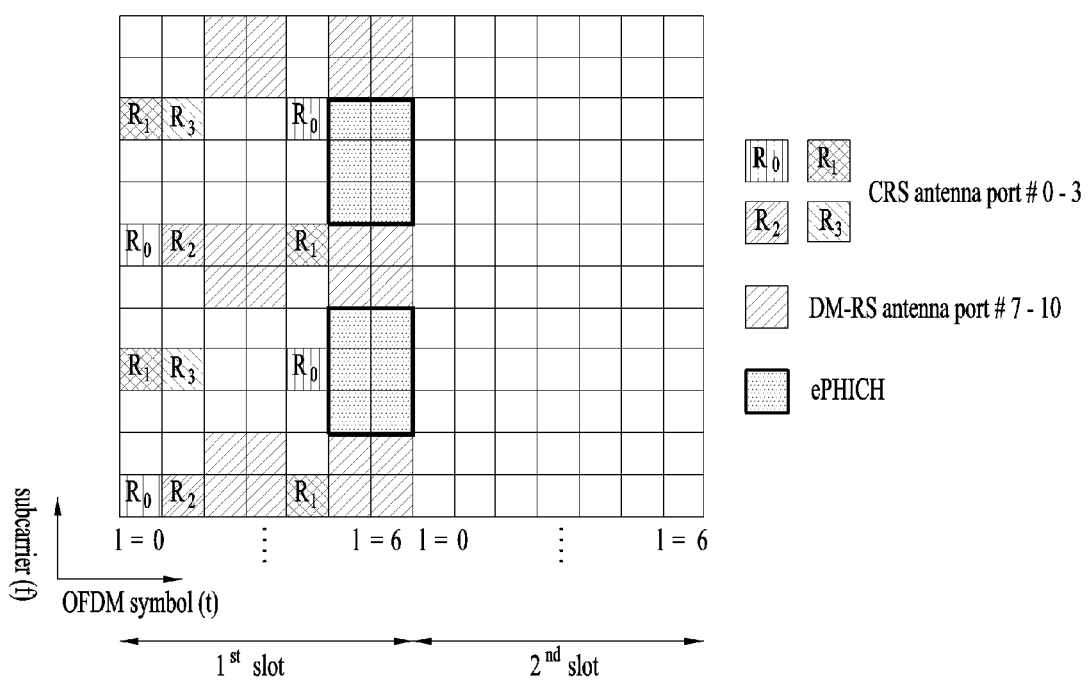

FIGS. 18 and 19 are views illustrating other examples of the ePHICH mapping pattern according to Embodiment 1 of the present invention. FIGS. 18 and 19 assume that an ePHICH uses 12 REs like a legacy PHICH as in FIGS. 13 to 17, and assume a TDD system which satisfies special subframe configurations #1, #2, #6, and #7, i.e., downlink pilot time slot (DwPTS)≤10 OFDM symbols.

For reference, a frame type used in the TDD system, e.g., a type-2 radio frame, includes 2 half frames and each half frame includes 4 normal subframes including 2 slots and a special subframe including a downlink pilot time slot (DwPTS), a guard period (GP), and an uplink pilot time slot (UpPTS). In this special subframe, DwPTS is used for initial cell search, synchronization, and channel estimation by a UE. UpPTS is used for channel estimation and synchronization with uplink transmission of the UE by an eNB. That is, DwPTS is used for downlink transmission and UpPTS is used for uplink transmission. In particular, UpPTS is used for PRACH preamble or SRS transmission. GP is a period for eliminating interference occurring in uplink due to a multipath delay of a downlink signal between uplink and downlink. The current 3GPP standard defines the special subframe as shown in Table 2. In Table 2, $T_s=1/(15000\times 2048)$ represents DwPTS and UpPTS, and the other region is set to the guard period.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

FIGS. 13 to 17 are views illustrating examples of an ePHICH mapping pattern according to Embodiment 1 of the present invention. Specifically, FIGS. 13 to 17 illustrate the case of a normal CP and assume that an ePHICH uses 12 REs like a legacy PHICH.

Figure 13:
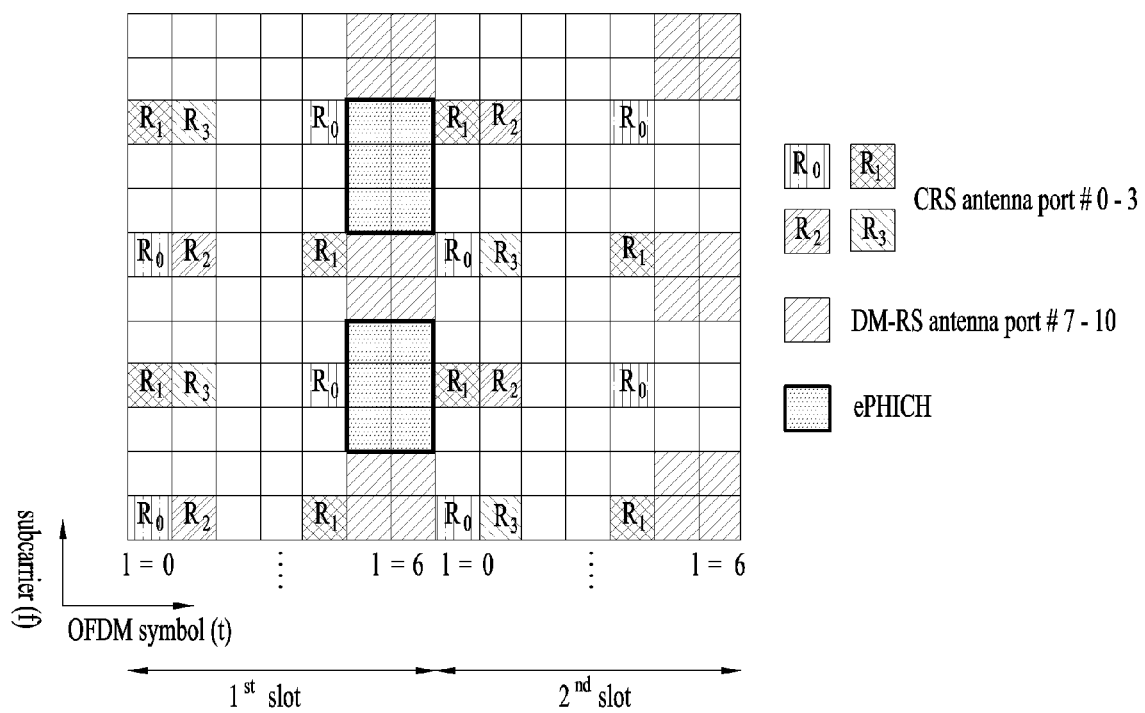
FIGS. 13 to 17 are views illustrating examples of an enhanced physical hybrid-ARQ indicator channel (ePHICH) mapping pattern according to Embodiment 1 of the present invention.
Figure 14:
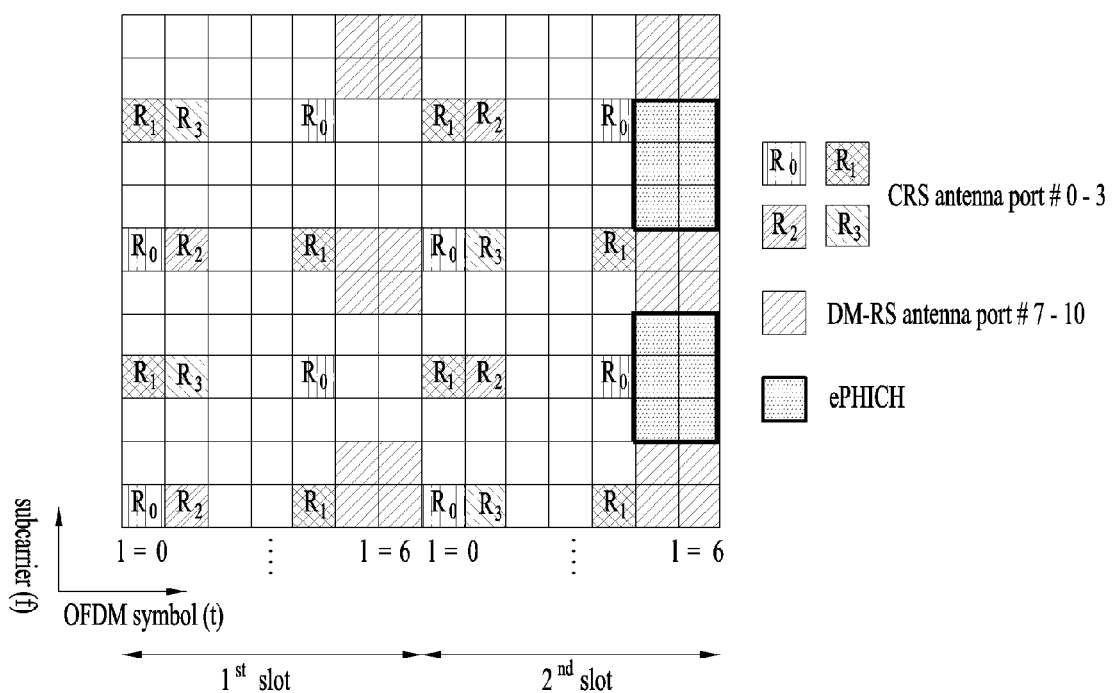

Referring to FIGS. 13 to 17, REs for an ePHICH are assigned in the vicinity of a DM-RS. Specifically, FIG. 13 illustrates an example in which REs for an ePHICH are assigned in the vicinity of a DM-RS located in a first slot, and FIG. 14 illustrates an example in which REs for an ePHICH are assigned in the vicinity of a DM-RS located in a second slot.

Figure 15:
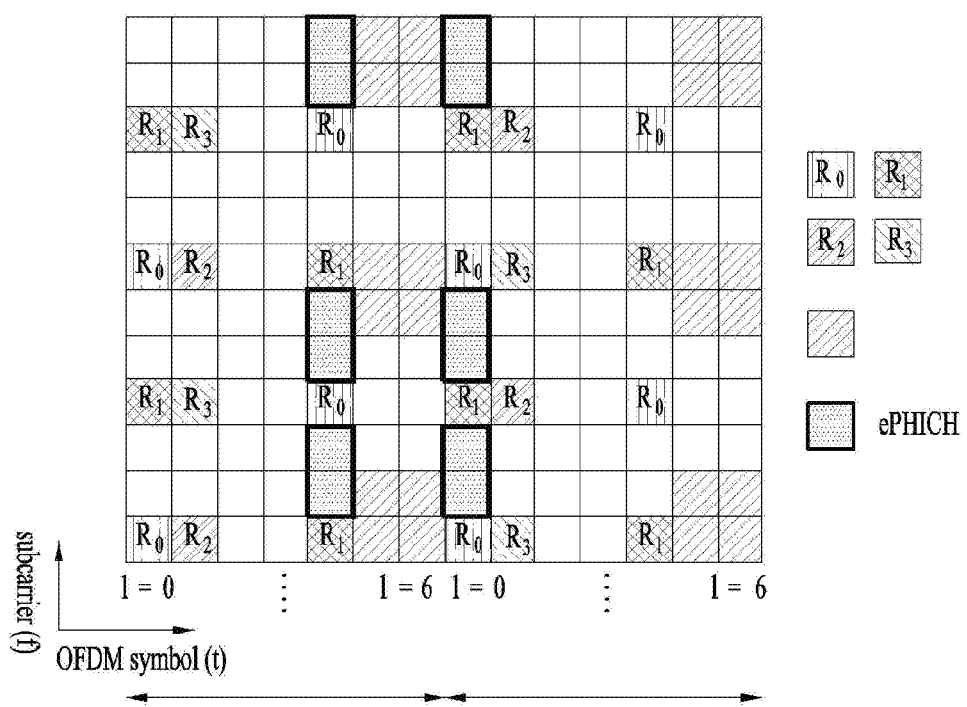
Figure 16:
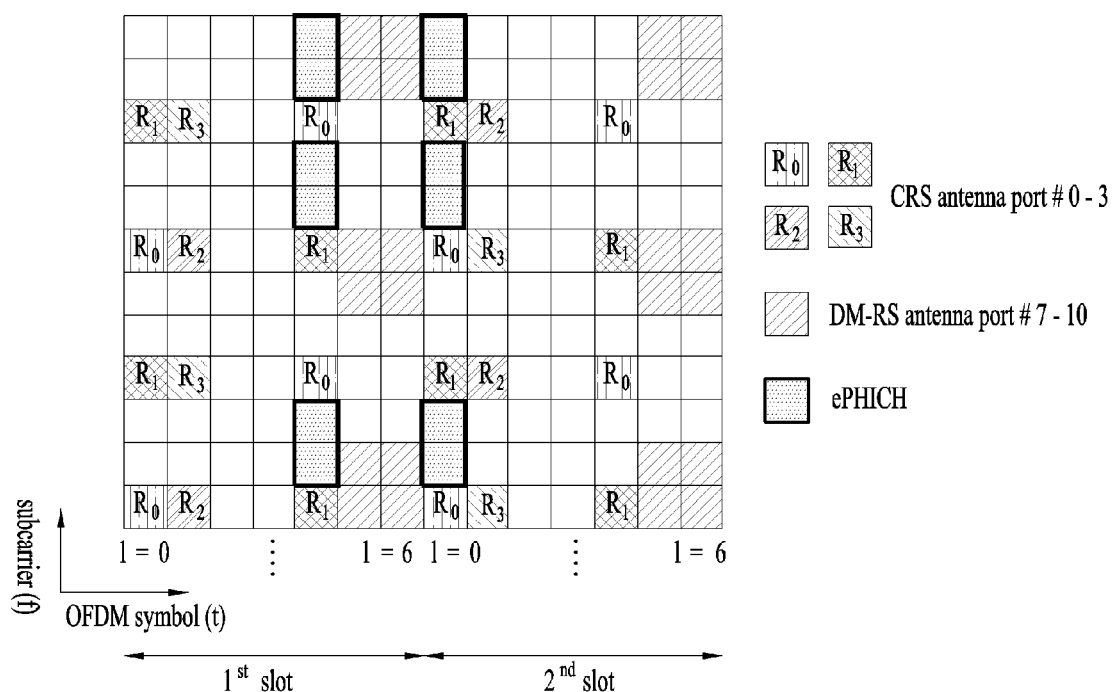

FIGS. 15 to 17 illustrate other examples in which REs for an ePHICH are assigned in the vicinity of a DM-RS located in a first slot, and may be extendably applied to the case in which REs for an ePHICH are assigned in the vicinity of a DM-RS located in a second slot.

Furthermore, assignment for a plurality of ePHICHs may be configured by combining the above-described examples of FIGS. 13 to 17. For example, if two groups of ePHICHs are configured, the examples of FIGS. 13 and 14 may be combined.

In FIGS. 18 and 19, REs for an ePHICH are also assigned in the vicinity of a DM-RS.

Figure 20:
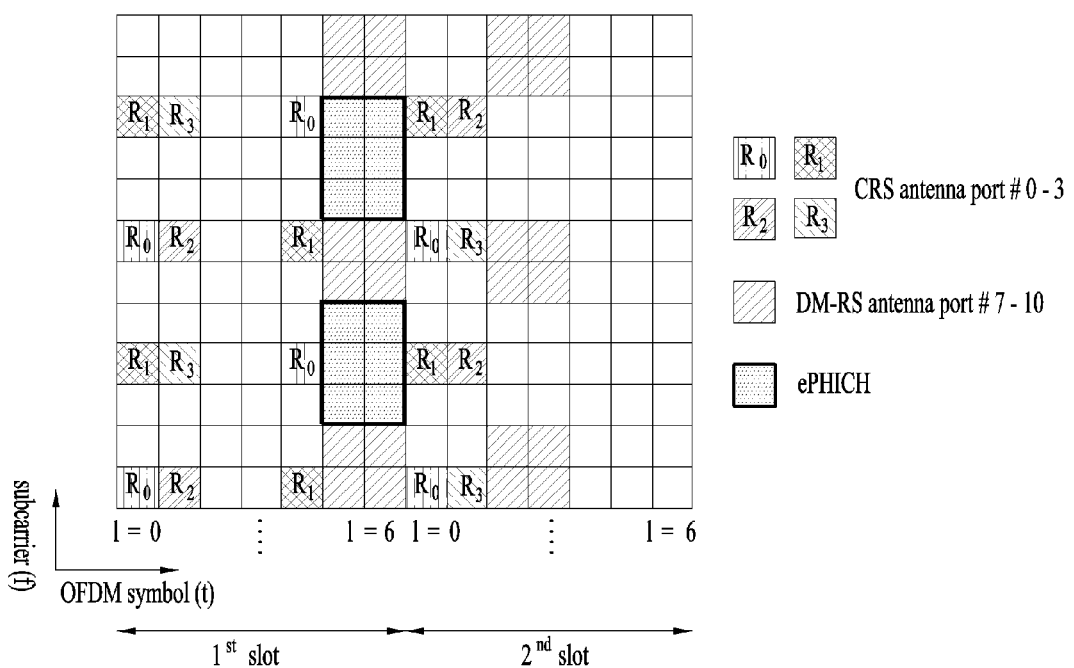
FIGS. 20 and 21 are views illustrating other examples of the ePHICH mapping pattern according to Embodiment 1 of the present invention.
Figure 21:
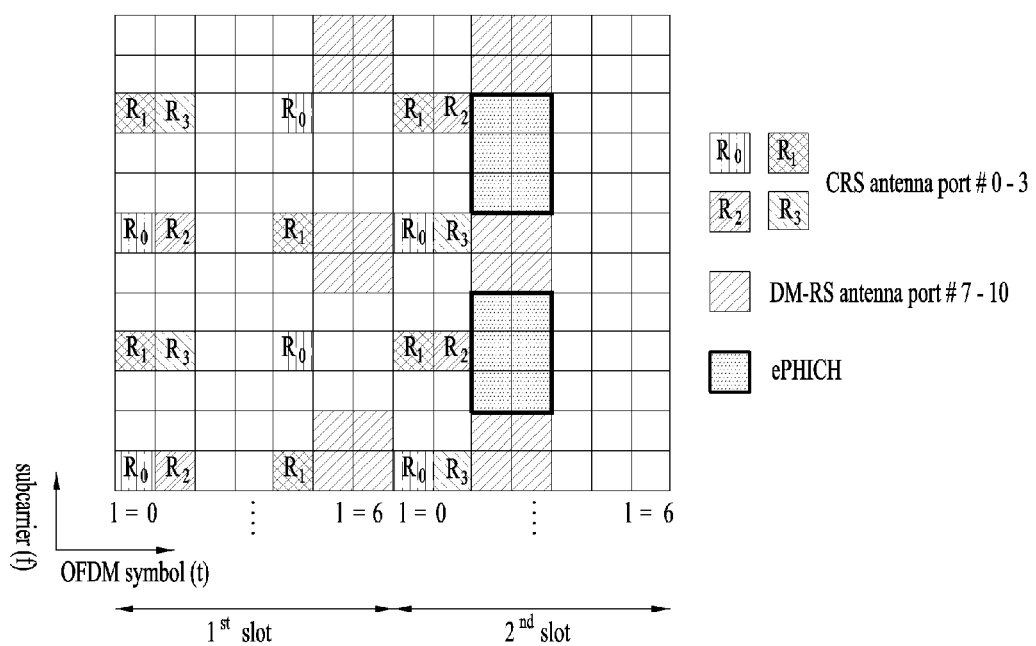

FIGS. 20 and 21 are views illustrating other examples of the ePHICH mapping pattern according to Embodiment 1 of the present invention. FIGS. 20 and 21 assume that an ePHICH uses 12 REs like a legacy PHICH as in FIGS. 13 to 19, and assume a TDD system which satisfies special subframe configurations #3, #4, and #8, i.e., 11 OFDM symbols≤DwPTS≤12 OFDM symbols.

In FIGS. 20 and 21, REs for an ePHICH are also assigned in the vicinity of a DM-RS.

Embodiment 2

An ePHICH region located in 1 PRB pair may include an ACK/NACK signal for multiple users. In addition, an ePHICH for one user may be transmitted over a plurality of PRBs. Due to this assignment scheme, a frequency diversity gain may be expected in ePHICH transmission.

In this case, according to Embodiment 2 of the present invention, a predefined DM-RS port only or a DM-RS port used to detect an E-PDCCH may be used to detect an ePHICH. That is, an ePHICH configured in an E-PDCCH transmission region may be multiplexed among a plurality of UEs and a legacy orthogonal cover code (OCC) or an orthogonal sequence may be used. However, additional definition regarding use of a DM-RS antenna port is required for channel estimation and detection of REs for the ePHICH.

1) First, a method in which all UEs detect ePHICHs using the same DM-RS port can be considered. For example, all UEs which detect ePHICHs in a given RB may detect the ePHICHs using DM-RS antenna port #7 only. In this case, the UEs may use different DM-RS ports to detect the ePHICHs. If only one group of ePHICHs are configured, A/N multiplexing and simultaneous transmission of up to 8 UEs are enabled in the case of a normal CP.

2) Second, a method in which each UE detects an ePHICH using only a DM-RS port used to detect its E-PDCCH can also be considered. For example, if UE #1 uses DM-RS antenna port #7 and UE #2 uses DM-RS antenna port #8 to detect their E-PDCCHs in a given RB, UE #1 detects an ePHICH using DM-RS antenna port #7 and UE #2 detects an ePHICH using DM-RS antenna port #8. According to this method, if only one group of ePHICHs are configured, the number of DM-RS antenna ports configured for E-PDCCH transmission equals to the number of UEs of which A/N multiplexing and simultaneous transmission are enabled.

Figure 22:
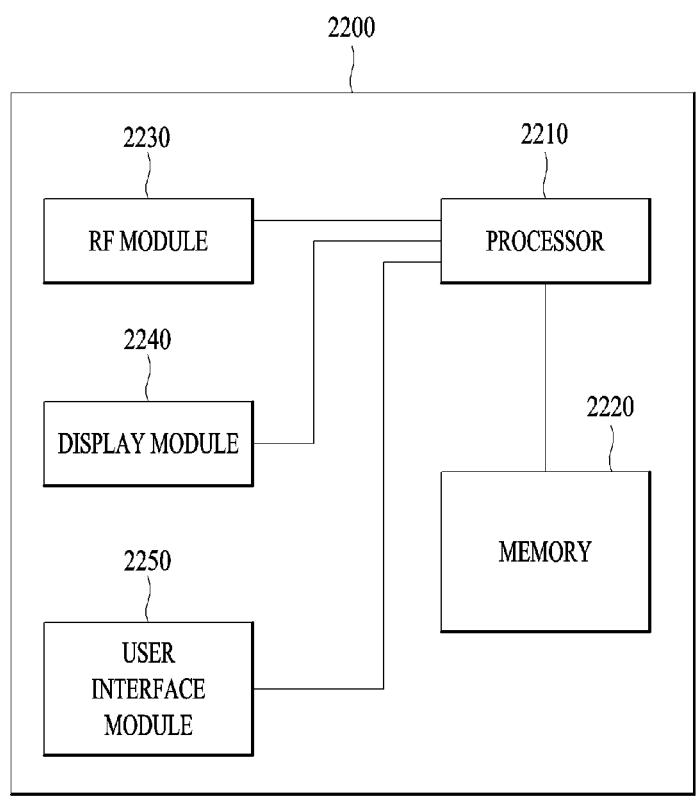
FIG. 22 is a block diagram of a communication apparatus according to an embodiment of the present invention.

FIG. 22 is a block diagram of a communication apparatus 2200 according to an embodiment of the present invention.

Referring to FIG. 22, the communication apparatus 2200 includes a processor 2210, a memory 2220, a radio frequency (RF) module 2230, a display module 2240, and a user interface module 2250.

The communication apparatus 2200 is illustrated for convenience of description and some modules thereof may be omitted. The communication apparatus 2200 may further include other modules as necessary. Some modules of the communication apparatus 2200 may be subdivided. The processor 2210 is configured to perform operations according to the embodiments of the present invention described with reference to the drawings. For a detailed description of the operations of the processor 2210, reference may be made to the descriptions given above in relation to FIGS. 1 to 21.

The memory 2220 is connected to the processor 2210 and stores an operating system, applications, program codes, data, etc. The RF module 2230 is connected to the processor 2210 and performs a function for converting a baseband signal into a radio signal or converting a radio signal into a baseband signal. To this end, the RF module 2230 performs analog conversion, amplification, filtering and frequency up-conversion, or inverse processes thereof. The display module 2240 is connected to the processor 2210 and displays various types of information. As the display module 2240, although not limited thereto, a well-known device such as a liquid crystal display (LCD), a light emitting diode (LED), or an organic light emitting diode (OLED) may be used. The user interface module 2250 is connected to the processor 2210 and may be configured by a combination of well-known user interfaces such as a keypad and a touch-screen.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the method for transmitting a downlink control channel by a base station in a wireless communication system, and the apparatus therefore have been described in the context of a 3GPP LTE system, the present invention is also applicable to many other wireless communication systems in addition to the 3GPP LTE system.

The invention claimed is:

1. A method for transmitting a downlink control channel by a base station in a wireless communication system, the method comprising:

mapping one or more enhanced Physical Hybrid-ARQ Indicator Channels (E-PHICHs) including acknowledgment (ACK)/negative ACK (NACK) information for uplink Hybrid-ARQ in a data region of a subframe, wherein the one or more E-PHICHs are mapped only to a set of Orthogonal Frequency Division Multiple (OFDM) symbols where User Equipment specific Reference Signals (UE-specific RSs) are mapped, and wherein the set of OFDM symbols consist of two consecutive OFDM symbols in the data region starting from an Nth (N>1) OFDM symbol in the subframe; and mapping one or more enhanced Physical Downlink Control Channels (E-PDCCHs) including downlink control information in the data region of the subframe; and transmitting the mapped one or more E-PHICHs and the mapped one or more E-PDCCHs, wherein the one or more E-PHICHs are transmitted through a preset antenna port, and wherein the one or more E-PDCCHs are transmitted through antenna ports different from the preset antenna port.

2. The method according to claim 1,
wherein one of the one or more E-PHICHs is demodulated by a UE based on the preset antenna port, and
wherein one of the one or more E-PDCCHs is demodulated by the UE based on a specific antenna port that varies among the antenna ports different from the preset antenna port.

3. A base station apparatus in a wireless communication system, the apparatus comprising:
a radio frequency unit; and
a processor operatively connected to the radio frequency unit, the processor arranged to:
map one or more enhanced Physical Hybrid-ARQ Indicator Channels (E-PHICHs) including acknowledgment (ACK)/negative ACK (NACK) information for uplink Hybrid-ARQ in a data region of a subframe,
wherein the one or more E-PHICHs are mapped only to a set of Orthogonal Frequency Division Multiple (OFDM) symbols where User Equipment specific Reference Signals (UE-specific RSs) are mapped, and
wherein the set of OFDM symbols consist of two consecutive OFDM symbols in the data region starting from an Nth (N>1) OFDM symbol in the subframe; and
map one or more enhanced Physical Downlink Control Channels (E-PDCCHs) including downlink control information in the data region of the subframe; and
transmit the mapped one or more E-PHICHs and the mapped one or more E-PDCCHs,
wherein the one or more E-PHICHs are transmitted through a preset antenna port, and
wherein the one or more E-PDCCHs are transmitted through antenna ports different from the preset antenna port.

4. The base station apparatus according to claim 3,
wherein one of the one or more E-PHICHs is demodulated by a UE based on the preset antenna port, and
wherein one of the one or more E-PDCCHs is demodulated by the UE based on a specific antenna port that varies among the antenna ports different from the preset antenna port.

* * * * *